United States Patent [19]

Kawabe et al.

[11] Patent Number: 5,391,695
[45] Date of Patent: Feb. 21, 1995

[54] PROCESS FOR PRODUCING BINDER RESIN AND DEVELOPER COMPOSITION FOR ELECTROPHOTOGRAPHY

[75] Inventors: Kuniyasu Kawabe, Wakayama; Yoko Matsumoto, Osaka, both of Japan

[73] Assignee: Kao Corporation, Tokyo, Japan

[21] Appl. No.: 150,285

[22] Filed: Nov. 10, 1993

Related U.S. Application Data

[60] Continuation of Ser. No. 958,772, Oct. 9, 1992, abandoned, which is a division of Ser. No. 770,278, Oct. 3, 1991, abandoned.

[30] Foreign Application Priority Data

Oct. 3, 1990 [JP] Japan .................. 2-267305

[51] Int. Cl.$^6$ ............................................ C08G 63/02
[52] U.S. Cl. .................... 528/272; 430/109; 430/111; 430/137; 430/904
[58] Field of Search ............... 528/272; 430/137, 109, 430/111, 904

[56] References Cited

U.S. PATENT DOCUMENTS

| | | | |
|---|---|---|---|
| 4,039,500 | 8/1977 | Bassett et al. | 524/804 |
| 4,206,109 | 6/1980 | Reischl et al. | 524/280 |
| 4,933,989 | 6/1990 | Kume et al. | 430/505 |
| 4,939,200 | 7/1990 | Stack et al. | 525/218 |
| 5,112,903 | 5/1992 | Sakakibara et al. | 524/54.2 |

FOREIGN PATENT DOCUMENTS

| | | |
|---|---|---|
| 3103779 | 1/1982 | European Pat. Off. . |
| 0321913 | 6/1989 | European Pat. Off. . |
| 0367265 | 5/1990 | European Pat. Off. . |
| 0376202 | 7/1990 | European Pat. Off. . |
| 2639254 | 3/1978 | Germany . |
| 3739057 | 5/1988 | Germany . |

*Primary Examiner*—John Kight, III
*Assistant Examiner*—Terressa M. Mosley
*Attorney, Agent, or Firm*—Sughrue, Mion, Zinn, Macpeak & Seas

[57] ABSTRACT

A process for producing a binder resin is disclosed, which comprises blending in a reactor a raw monomer for a first polymerization system and a raw monomer for a second polymerization system which undergoes polymerization through a reaction path different from a reaction path of said first polymerization system and then conducting said first and second polymerization reactions in the same reactor. A toner and a developer composition employing the binder resin are also disclosed. The binder resin can easily be pulverized and can give toners and developer compositions which hold a good charge and from which an environmentally stable fixed image can be obtained.

3 Claims, No Drawings

PROCESS FOR PRODUCING BINDER RESIN AND DEVELOPER COMPOSITION FOR ELECTROPHOTOGRAPHY

This is a continuation of application Ser. No. 07/958,772, filed Oct. 9, 1992, now abandoned, which is a divisional of U.S. Ser. No. 07/770,278, filed Oct. 3, 1991, now abandoned.

FIELD OF THE INVENTION

The present invention relates to a process for producing a binder resin and a developer composition for electrophotography.

BACKGROUND OF THE INVENTION

As described, for example, in U.S. Pat. Nos. 2,297,691 and 2,357,809, a conventional electrophotographic process comprises the steps of: uniformly charging a photoconductive insulating layer; selectively exposing the charged layer to light to dissipate the charges on the surface in the illuminated regions, to thereby form a latent electrostatical image; allowing a colored and charge-bearing fine powder, called a toner, to adhere to the latent image, to thereby make the latent image visible (development step); transferring the visible toner image to a receiving material such as paper (transfer step); and then permanently fixing the toner image to the receiving material by heating, pressing or some other suitable fixing means (fixing step).

The toner, therefore, should have all the functions required for not only the development step but the transfer and fixing steps.

In general, toners in a mechanical developing apparatus suffer mechanical friction when they receive shearing and impact forces caused by the mechanical operation of the apparatus, and the toners deteriorate when several thousand to several ten thousand copies are produced. Such a toner deterioration may be avoided by the use of a tough resin which has a high enough a molecular weight to be able to withstand the mechanical friction. However, resins of this kind generally have high softening points, so that fixing of toners employing such resins by a non-contact fixing method such as oven fixing or radiant fixing using infrared radiation cannot be sufficiently conducted because of poor thermal efficiency. Further, in the case of heated roller fixing which is a contact fixing technique extensively used because of its good thermal efficiency, there is the drawback that the temperature of the heated roller must be increased in order to attain sufficient fixing and the thus elevated roller temperature leads to a deterioration of the fixing apparatus, a curling of paper, an increase in the energy consumption, etc. In addition, if such resins are used for producing toners, production efficiency is considerably lowered since the pulverizability of such resins is poor. Because of these drawbacks, binder resins whose polymerization degrees and softening points are too high cannot be used.

The heated roller fixing method involves exceedingly good thermal efficiency because a heated roller is brought into contact with a receiving sheet so that the toner image on the receiving sheet is pressed by the heated roller surface. Although this fixing method is widely used at fixing speeds ranging from low to high due to its good thermal efficiency, an offset phenomenon is apt to occur where part of the toner adheres to the heated roller surface during contact of the heated roller with the toner image and is then transferred to a receiving paper or other receiving sheet. In order to avoid this phenomenon, rollers having surface layers made of a material with excellent release properties, such as a fluoroplastic, are employed and, in addition, a release agent such as a silicone oil or the like is coated on the roller surfaces. However, such a fixing apparatus in which a silicone oil or another release agent is coated on the roller surfaces is not preferred in that not only does the apparatus necessarily have an increased enlarged size and become more costly, but also the resulting complicated structure is prone to be a cause of problems.

As described in JP-B-57-493, JP-A-50-44836, and JP-A-57-37353, the offset phenomenon is less apt to occur if one uses a resin which has been made asymmetric and crosslinked. (The terms "JP-B" and "JP-A" as used herein mean an "examined Japanese patent publication" and an "unexamined published Japanese patent application", respectively.) However, this expedient has failed to improve fixing properties.

In general, the lowest fixing temperature for a toner is between the cold offset-disappearing temperature and the hot offset-occurring temperature and, hence, the usable temperature range is from the lowest fixing temperature to the hot offset-occurring temperature. Therefore, by lowering the lowest fixing temperature as much as possible and by increasing the hot offset-occurring temperature as much as possible, the usable fixing temperatures can be lowered and the usable temperature range can be increased at the same time, thereby attaining energy saving, high speed fixing and prevention of paper curling.

For such reasons, there is a need for a resin or toner which always has good fixing properties and offset resistance.

In the case where a styrene-based binder resin is used to meet the above requirements, it is known that paraffin wax, a low-molecular polyolefin or the like can be added as an anti-offset agent, as described in JP-A-49-65232, JP-A-50-28840, and JP-A-50-81342. This technique, however, is disadvantageous because it has been ascertained that such an additive must be incorporated in a relatively large amount in order to produce the desired effect and the large additive amount results in accelerated deterioration of the developer.

Polyester resins originally possess good fixing properties, so that polyester resin based toners can be satisfactorily fixed even by non-contact fixing methods as described in U.S. Pat. No. 3,590,000. However, it is difficult to fix such toners by heated roller fixing because the offset phenomenon is apt to occur. Although polyester resins whose offset resistance has been improved by using polybasic carboxylic acids have been proposed in JP-A-50-44836, JP-A-57-37353, and JP-A-57-109875, the offset resistance of some of such polyester resins is still insufficient for practical use, and the other polyester resins have attained sufficient offset resistance at the expense of the low temperature fixing properties originally possessed by the polyester resins and further have had a problem that they show extremely poor pulverizability when formulated into toners.

Toners having smaller particle diameters are being developed for the purpose of obtaining higher resolution in electrophotography. However, the problem which remains unsolved is how such small particle diameter toners can be produced efficiently at low cost.

In the case of producing toners using a polyester resin having an acid value or hydroxyl value particularly suitable for improved dispersibility of colorants, such toners have been limited in composition, as compared with toners employing a styrene-acrylic resin, if they are required to have a sufficient charge amount and also to have good environmental stability of fixed images. Studies have, therefore, been made on the combined use of polyester resins and styrene-acrylic resins, and the following have, for example, been proposed: to merely blend a polyester resin with a styrene-acrylic resin as described in JP-A-49-6931, JP-A-54-114245, JP-A-57-70523, and JP-A-2-161464; to form chemical bonds between a polyester resin and a styrene resin as described in JP-A-56-116043; to copolymerize a vinyl monomer with an unsaturated polyester as described in JP-A-57-60339, JP-A-63-279265, JP-A-1-156759, and JP-A-2-5073; to copolymerize a vinyl monomer with a polyester resin having a (meth)acryloyl group as described in JP-A-59-45453; to copolymerize a reactive polyester with a vinyl monomer in the presence of a polyester resin as described in JP-A-2-29664; and to form a block copolymer by bonding a polyester resin and a vinyl resin through an ester bond as described in JP-A-2-881. However, since the compatibility between polyester resins and styrene-acrylic resins is poor, binder resins obtained by mere mechanical blending of these two different kinds of resins are disadvantageous in that, depending on to the proportion of each resin, toners employing such binder resins may give fixed images that cause ground sheet fouling. Further, the copolymerization of a vinyl monomer with a reactive polyester is limited with respect to the copolymerization used ratio in order to prevent gelation.

SUMMARY OF THE INVENTION

The present invention has been completed in order to eliminate the above-described problems.

An object of the present invention is to provide a process for producing a binder resin for developer compositions which is based on a combination of a polyester resin and a vinyl resin and which will yield developer compositions that can carry a desired amount of charge and which provide fixed images of good environmental stability and also to provide and a developer composition employing such a binder resin.

Another object of the present invention is to provide a process for producing a binder resin which can be used to produce developers that are free from the offset phenomenon in heated roller fixing even without the application of an anti-offset agent and which developers can be fixed at lower fixing temperatures, and also to provide a developer composition employing such a binder resin.

Still another object of the present invention is to provide a process for producing a binder resin for developers which can easily be pulverized and also to provide a toner and a developer composition employing this binder resin.

Other objects and effects of the present invention will be apparent from the following description.

DETAILED DESCRIPTION OF THE INVENTION

The present invention provides a process for producing a binder resin which comprises blending in a reactor a raw monomer for a first polymerization system and a raw monomer for a second polymerization system which undergoes polymerization through a reaction path different from a reaction path of the first polymerization system, and then conducting the first and second polymerization reactions in the same reactor; and further provides a developer composition employing the above binder resin.

It is preferred that one of the first and second polymerization systems, each of which undergoes a polymerization reaction through an independent reaction path, be of the addition polymerization type and the other be of the condensation polymerization type or the ring opening polymerization type.

Representative examples of the addition polymerization type polymerization system include those yielding a vinyl resin by a radical polymerization.

Representative examples of the condensation polymerization type polymerization system include those yielding a polyester, a polyester-polyamide a polyamide or a polyimide by a condensation polymerization and representative examples of the ring opening polymerization system include those yielding a polyester, a polyester-polyamide, a polyamide or a polyimide by a ring opening polymerization. Among them, a polyester, a polyester-polyamide and a polyamide are preferred as the resins obtained by the condensation polymerization or the ring opening polymerization.

In the case where one of the first and second polymerization systems each undergoing a polymerization reaction through an independent reaction path is a condensation polymerization system for yielding a polyester, raw monomers for the polyester may be an alcohol and a carboxylic acid, carboxylic acid ester, carboxylic anhydride, hydroxycarboxylic acid or the like.

Examples of useful dihydric alcohol monomer components include alkylene oxide adducts of bisphenol A of which 1 to 5 moles of an alkylene oxide containing 2 to 4 carbon atoms are added, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, polyoxypropylene(6)-2,2-bis(4-hydroxyphenyl)propane, and the like, and further include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and the like. These monomers may be used either alone or as a mixture of two or more thereof according to need.

Examples of useful alcohol monomer components having three or more hydroxyl groups include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and the like. These monomers may be used either alone or as a mixture of two or more thereof according to need.

Examples of useful dibasic carboxylic acids as the acid monomer component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids, $C_{1-4}$ lower alkyl esters of these acids and the like. These monomers may be used either alone or as a mixture of two or more thereof according to need.

Examples of useful tribasic or polybasic carboxylic acids as the acid monomer component, include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxy) methane, 1,2,7,8-octanetetracarboxylic acid, pyromellitic acid, empole trimer acid, anhydrides of these acids, and $C_{1-4}$ lower alkyl esters of these acids. These monomers may be used either alone or as a mixture of two or more thereof according to need.

Examples of useful hydroxycarboxylic acid include 6-hydroxyhexanoic acid, 3-hydroxypropioic acid and the like. These monomers may be used either alone or as a mixture of them.

In the case where one of the first and second polymerization systems each undergoing a polymerization reaction through an independent reaction path is a condensation polymerization system for yielding a polyester-polyamide or a polyamide, a polyamine is used as one of the raw monomers for forming the polyamide moiety in the polymer product. Examples of the polyamine include polyamines such as ethylenediamine, pentamethylenediamine, hexamethylenediamine, diethylenetriamine, iminobispropylamine, phenylenediamine, xylylenediamine, triethylenetetramine, and the like; aminocarboxylic acids such as 6-aminocaproic acid, $\epsilon$-caprolactam, 3-aminopropionic acid, 5-aminocapric acid and the like, and amino alcohols such as propanolamine and the like. These monomers may be used either alone or as a mixture of two or more thereof according to need.

When a polyester-polyamide is prepared, it is preferable that the molar ratio of the polyester moiety to the polyamide moiety in the polyester-polyamide ranges from 50/50 to 95/5. As a raw monomer for the polyester moiety in the polyester-polyamide, those mentioned above in relation to polyesters can be used. As a carboxylic acid which is used as a raw monomer for a polyamide or a polyamide moiety of the polyester-polyamide, those mentioned above in relation to polyesters can be used. Among these raw monomers, those belonging to an aromatic carboxylic acid are preferred as an acid component.

In the case where one of the first and second polymerization systems each undergoing a polymerization reaction through an independent reaction path is a ring opening polymerization system for yielding a polyester, a polyester-polyamide or a polyamide, $\epsilon$-caprolactone, $\epsilon$-caprolactam and the like can be used as one of the raw monomers. These monomers may be used either alone or as a mixture of them.

In the case where the other of the first and second polymerization systems each undergoing a polymerization reaction through an independent reaction path is an addition polymerization system, it is preferred that a vinyl resin be produced by this polymerization. In this case, a polymerization initiator such as a peroxide, azo compound, or the like is used.

Representative monomers that can be used for forming vinyl resins include ethylenically unsaturated aromatic compounds such as styrene, o-methylstyrene, m-methylstyrene, p-methylstyrene, $\alpha$-methylstyrene, p-ethylstyrene, 2,4-dimethylstyrene, p-chlorostyrene, vinylnaphthalene; ethylenically unsaturated monoolefins such as ethylene, propylene, butylene, isobutylene, and the like, vinyl esters such as vinyl chloride, vinyl bromide, vinyl fluoride, vinyl acetate, vinyl propionate, vinyl formate, vinyl caproate, and the like; ethylenically unsaturated monocarboxylic acids and esters thereof such as acrylic acid (meth)acrylic acid, methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl $\alpha$-chloroacrylate, methacrylic acid, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, diethylaminoethyl methacrylate, and the like; ethylenically unsaturated monocarboxylic acid derivatives such as acrylonitrile, methacrylonitrile, acrylamide, and the like; ethylenically unsaturated dicarboxylic acids and derivatives thereof such as dimethyl maleate and the like; vinyl ketones such as vinyl methyl ketone and the like; vinyl ethers such as vinyl methyl ether and the like; vinylidene halides such as vinylidene chloride and the like; and N-vinyl-substituted compounds such as N-vinylpyrrole, N-vinylpyrrolidone, and the like. These monomers may be used alone or as a mixture of two or more thereof according to need.

Among them, styrene and (meth)acrylic acid are preferred.

A crosslinking agent selected from those conventionally used may suitably be used for forming vinyl resins. Examples thereof include divinylbenzene, divinylnaphthalene, polyethylene glycol dimethacrylate, diethylene glycol diacrylate, triethylene glycol diacrylate, 1,3-butylene glycol dimethacrylate, 1,6-hexylene glycol dimethacrylate, neopentyl glycol dimethacrylate, dipropylene glycol dimethacrylate, polypropylene glycol dimethacrylate, 2,2'-bis(4-methacryloxydiethoxyphenyl)propane, 2,2'-bis(4-acryloxydiethoxyphenyl)-propane, trimethylolpropane trimethacrylate, trimethylolpropane triacrylate, tetramethylolmethane tetraacrylate, dibromoneopentyl glycol dimethacrylate, diallyl phthalate, and the like. These may be used alone or as a combination of two or more thereof according to need.

If the amount of such a crosslinking agent used is too large, toners obtained using the resulting binder resin are apt to be less heat fusible to have poor heat fixing properties or heat pressure fixing properties. If the amount thereof is too small, it is difficult in heated roller fixing to prevent the toners from the offset phenomenon in which not all of the toner adhering to the receiving paper is fixed to the paper and part of the toner adheres to the roller surface and is then transferred to the succeeding sheet of paper. Therefore, the crosslinking agent is preferably used in an amount of from 0.001 to 15% by weight, more preferably from 0.1 to 10% by weight, based on the total amount of the polymerizable monomer(s) used for forming vinyl resins.

Examples of the polymerization initiator used for producing a vinyl resin include azo-type or diazo-type polymerization initiators such as 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and the like; and peroxide-type polymerization initiators such as benzoyl peroxide, methyl ethyl ketone peroxide, isopropyl peroxycarbonate, cumene hydroperoxide, 2,4-dichlorobenzoyl peroxide, lauroyl peroxide, dicumyl peroxide, and the like.

It is also possible to use two or more polymerization initiators in combination for the purpose of regulating the molecular weight and molecular weight distribution of the polymer produced, controlling the reaction time, or for other purposes.

The polymerization initiator is used in an amount of generally from 0.1 to 20 parts by weight, preferably from 1 to 10 parts by weight, per 100 parts by weight of the polymerizable monomer(s) for forming vinyl resins.

In the present invention, the raw monomers for the first and second polymerization systems which each undergoes a polymerization reaction through an independent reaction path may be the same compound so long as the first and second polymerization reaction paths proceed independently to yield two resins different from each other.

In view of image-fixing properties, molecular weights of the resins obtained through the addition polymerization path and the condensation or ring opening polymerization path according to the present invention are preferably from 3,000 to 11,000 and from 3,000 to 10,000, respectively, in terms of the number average molecular weight.

According to the present invention, a binder resin having an improved capability to be pulverized can be obtained by lowering the molecular weight of the resin obtained through one of the two reaction paths.

In particular, a vinyl resin having a number average molecular weight of 11,000 or less is effective in improving the ability of the binder resin to be easily pulverized. Number average molecular weights of 11,000 or less can be easily attained by using a polymerization initiator in an increased amount or by using a chain transfer agent as disclosed, for example, in JP-B-57-493.

In one representative example of the process for producing a binder resin which is a blend of a polyester, polyester-polyamide, or polyamide resin and a vinyl resin, a mixture of one or more raw monomers for the vinyl resin with a polymerization initiator is dropwise added to and mixed with a mixture comprising the raw monomers for the polyester, polyester-amide or polyamide resin placed in a reactor. Thereafter, the polymerization reaction for yielding a vinyl resin is completed firstly by means of radical polymerization, and following raising the reaction temperature, the polymerization for yielding a polyester, polyester-polyamide or polyamide resin is then completed by condensation polymerization. By such a method in which two independent reactions are allowed to proceed in one reactor, a binder resin can be obtained which consists of a mixture of two kinds of resins where one of the two resins is effectively dispersed in the other resin.

It is not necessary that the above-described two reactions be conducted in such a manner that the reactions proceed at the same time and are completed at the same time. The two reactions may be carried out successively in sequence by suitably selecting the reaction temperature (preferably at from room temperature to 250° C.), pressure (reduced, atmospheric or pressurized) and time according to the reaction mechanism of each polymerization.

In the case where a binder resin, such as that described above, consisting of a blend of a condensation polymer resin (A) selected from a polyester, a polyester-amide and a polyamide and a vinyl resin (B), such as a styrene-acrylic resin, is obtained by the process of the present invention, the proportion of the condensation polymer resin (A) to the vinyl resin (B) in the binder resin is preferably from 10:90 to 90:10 parts by weight.

The binder resin thus produced by the process described above preferably has a softening point of from 95° to 170° C., more preferably from 100° to 160° C., and a glass transition temperature of from 50° to 80° C., more preferably from 55° to 70° C. Such a binder resin having a softening point and glass transition temperature, respectively, in the above-specified ranges can easily be obtained by regulating the amount of the polymerization initiator or catalyst added to the raw monomer mixture or selecting the reaction conditions.

The resin produced by the process of the present invention can be used as a binder resin ingredient to obtain a toner. In toner preparation, a colorant is added to the binder resin and, if required and necessary, a charge control agent and a magnetic material may further be added and incorporated.

Examples of colorants that can be employed in the toner according to the present invention include various kinds of carbon blacks produced by various processes, for example, by the thermal black, acetylene black, channel black, and lamp black processes, other colorants such as Phthalocyanine Blue, Permanent Brown FG, Brilliant Fast Scarlet, Pigment Green B, Rhodamine B Base, Solvent Red 49, Solvent Red 146, Solvent Blue 35, and the like, and mixtures thereof. Normally, such a colorant is used in an amount of about from 1 to 15 parts by weight per 100 parts by weight of the binder resin.

The charge control agent, which may be employed in the toner of this invention according to need, may be either a positive-charge control agent or a negative-charge control agent. Examples of the positive-charge control agent include nigrosine dyes such as "Nigrosine Base EX", "Oil Black BS", "Oil Black SO", "Bontron N-01", "Bontron N-11" (the above being trade names of products manufactured by Orient Chemical Industries Ltd., Japan), and "Copy Blue PR" (trade name of a product manufactured by Hoechst); triphenylmethane dyes containing a tertiary amine as a pendant group; quaternary ammonium salt compounds such as "Bontron P-51" (trade name of a product manufactured by Orient Chemical Industries Ltd.), cetyltrimethylammonium bromide, and "Copy Charge PX VP435" (trade name of a product manufactured by Hoechst); polyamine resins such as "AFP-B" (trade name of a product manufactured by Orient Chemical Industries Ltd.); imidazole derivatives such as "PLZ-2001" and "PLZ-8001" (the above being trade names of products manufactured by Shikoku Chemicals Corp., Japan); and the like. Examples of the negative-charge control agent include metal-containing azo dyes such as "Valifast Black 3804", "Bontron S-31", "Bontron S-32", "Bontron S-34", "Bontron S-36" (the above being trade names of products manufactured by Orient Chemical Industries Ltd.), and "Aizen Spilon Black TVH" (trade names of products manufactured by Hodogaya Chemical Co., Ltd., Japan); copper phthalocyanine dyes; metal complexes of salicylic acid alkyl derivatives, such as "Bontron E-82", "Bontron E-84", and "Bontron E-85" (the above being trade name of a product manufactured by Orient Chemical Industries Ltd.); quaternary ammonium salts such as "Copy Charge NX VP434 (trade name of a product manufactured by Hoechst); and the like.

Such a charge control agent may be incorporated in the toner in an amount of from 0.1 to 8.0% by weight, preferably from 0.2 to 5.0% by weight, based on the amount of the binder resin.

In the production of conventional toners, modifiers are usually added or incorporated therein, such as polyolefin waxes and other waxes, as anti-offset agents, and hydrophobic silica and the like as flow modifiers. However, in the case of toners employing the resin according to the present invention as a binder resin, there is no need of adding such a modifier, and even if a modifier is incorporated, its amount can be reduced, for example, an anti-offset agent and a flow modifier may be used in an amount of 0.5 to 5.0% by weight and 0.05 to 2.0% by weight, respectively.

Using the resin of the present invention as an essential ingredient, a toner can be obtained as follows. A colorant and, according to need, a charge control agent, a magnetic material and/or a modifier, are uniformly dispersed into the resin of this invention, and the resulting mixture is melt kneaded, cooled, pulverized, and then classified by known to techniques, to thereby obtain a toner having an average particle diameter of 5 to 15 $\mu$m. This toner may be mixed with a magnetic powder, i.e., an iron oxide carrier, a truly spherical iron oxide carrier, or a ferrite carrier, to give a dry two-component developer. In this case, the magnetic powder is used as it is or after being coated with a resin or other material.

In the case of producing a magnetic toner using the binder resin according to the present invention, the magnetic material used may, for example, be a powder of a ferromagnetic metal such as iron, cobalt, nickel, etc., or an alloy or compound containing an element exhibiting ferromagnetism such as ferrite, hematite, magnetite, etc. The magnetic material may be used in the form of a fine powder having an average particle diameter of from 0.1 to 1 $\mu$m, and the amount of the magnetic material dispersed into the binder resin may be about from 30 to 70 parts by weight per 100 parts by weight of the binder resin.

As described above, a binder resin for developer compositions which can easily be pulverized and can give toners and developer compositions which will hold a good charge and in which are environmental by stability with respect to the fixed images obtained therefrom can be produced by the process of the present invention, and a toner and a developer composition employing this binder resin can be obtained according to the present invention.

Furthermore, a binder resin which enables toners or developer compositions obtained therefrom to be fixed at low temperatures by the heated roller fixing method without using an anti-offset agent can be produced by the process of the present invention, and a toner and a developer composition employing this binder resin can be obtained according to the present invention.

The present invention is explained below in more detail with reference to the following Examples and Comparative Examples, but the Examples should not be construed as limiting the scope of the invention. In these examples, all parts are by weight.

EXAMPLE 1

In a dropping funnel were placed 700 g of styrene and 300 g of butyl methacrylate as monomers for a vinyl resin and 50 g of dicumyl peroxide as a polymerization initiator.

In a 5-l four-necked glass flask were then introduced 390 g of polyoxypropylene(2.2)-2,2-bis(4-hydroxyphenyl)propane, 120 g of isophthalic acid, 38 g of 1,2,5-benzenetricarboxylic acid, and 1 g of dibutyltin oxide. This flask was provided with a thermometer, a stainless steel stirring rod, a flow down type condenser and a nitrogen introduction tube, and then covered with a mantle heater. While the contents in the flask were kept being stirred at a rotation speed of 350 rpm at a temperature of 135° C. in a nitrogen stream under atmospheric pressure, the above-described vinyl resin monomers and polymerization initiator were dropwise added thereto from the dropping funnel over a period of 4 hours. The resulting reaction mixture was aged for 5 hours at the same temperature of 135° C., and it was then heated to 220° C. and kept at 220° C. to thereby allow reaction to proceed.

The change in polymerization degree was traced by softening point measurement in accordance with ASTM E28-67. At the time the softening point of the resin being produced reached 120° C., the reaction was terminated. The resin thus obtained was a pale-yellow solid. The glass transition temperature of this resin was measured by differential scanning calorimetry (hereinafter abbreviated as "DSC") and, as a result, the chart had only one peak, showing that the glass transition temperature was 62° C.

The fact that the DSC chart for the above-obtained resin had only one endothermic peak shows that the two resinous components of the resin were well dispersed in each other. This can be seen from a comparison between the DSC chart for the above-obtained resin and the DSC chart for the resin obtained in Comparative Example 1 later given.

The above-obtained resin is hereinafter called Binder resin (1).

EXAMPLE 2

In a dropping funnel were placed 820 g of styrene and 180 g of 2-ethylhexyl acrylate as monomers for a vinyl resin and 40 g of azobisisobutyronitrile as a polymerization initiator. In a 5-l four-necked glass flask were then introduced 390 g of polyoxyethylene(2.2)-2,2-bis(4-hydroxyphenyl)propane, 12 g of fumaric acid, 55 g of isododecenylsuccinic anhydride, 110 g of terephthalic acid, and 1 g of dibutyltin oxide. This flask was provided with a thermometer, a stainless steel stirring rod and a nitrogen introduction tube. Subsequently, polymerization was conducted in the same manner and under the same reaction conditions as in Example 1.

The glass transition temperature of the thus-obtained resin was determined by DSC and was found to be 60° C. Since the DSC chart had only one peak, it can be seen that the two resinous components of this resin were well dispersed in each other, as in the case of the resin of Example 1.

The above-obtained resin is hereinafter called Binder resin (2).

EXAMPLE 3

In a dropping funnel were placed 400 g of styrene and 77 g of 2-ethylhexyl acrylate as monomers for a vinyl resin and 3 g of divinylbenzene as a polymerization initiator.

In a 5-l four-necked glass flask were then introduced 720 g of polyoxyethylene(2.2)-2,2-bis(4-hydroxyphenyl) propane, 13 g of 6-aminocaproic acid, 130 g of isophthalic acid, and 50 g of isododecenylsuccinic anhydride. This flask was provided with a thermometer, a stainless steel stirring rod and a nitrogen introduction tube. Subsequently, polymerization was conducted in the same manner and under the same reaction conditions as in Example 1.

The glass transition temperature of the thus-obtained resin was determined by DSC and was found to be 63° C. Since the DSC chart had only one peak, it can be seen that the two resinous components of this resin were well dispersed in each other, as with the resin of Example 1.

The above-obtained resin is hereinafter called Binder resin (3).

COMPARATIVE EXAMPLE 1

In a 2-l four-necked glass flask equipped with a thermometer, a stainless steel stirring rod, a flow down type condenser, a dropping funnel and a nitrogen introduction tube was introduced 550 g of xylene. After replacement with nitrogen, the xylene was heated to 135° C.

In the dropping funnel were then placed 700 g of styrene, 300 g of butyl methacrylate, and 50 g of dicumyl peroxide. This mixture in the dropping funnel was dropwise added to the xylene in the flask over a period of 4 hours while keeping the contents at 135° C., and the resulting reaction mixture was aged for 5 hours at the same temperature of 135° C. The reaction mixture was then heated to 200° C. and the xylene was removed by evaporation under reduced pressure. The residue was taken out of the flask and placed in a vat, where it was cooled and then pulverized. The softening point of the thus-obtained resin was measured in accordance with ASTM E28-67 and was found to be 110° C. The glass transition temperature of the resin was 66° C.

In a 5-l four-necked glass flask were then introduced 1,000 g of the above-obtained resin, 390 g of polyoxypropylene(2.2)-2,2-bis(4-hydroxyphenyl)propane, 120 g of isophthalic acid, 38 g of 1,2,5-benzenetricarboxylic acid and 1 g of dibutyltin oxide. This flask was provided with a thermometer, a stainless steel stirring rod, a flow down type condenser and a nitrogen introduction tube, and then covered with a mantle heater. The reaction mixture was then heated to 220° C. and kept at this temperature to thereby allow reaction to proceed.

The change in polymerization degree was traced by softening point measurement in accordance with ASTM E28-67. At the time when the softening point of the resin had reached 120° C., the reaction was terminated. The resin thus obtained was a pale-yellow solid. The glass transition temperature of this resin was measured by DSC and, as a result, the chart had two peaks at 61° C. and 65° C.

The above-obtained resin is hereinafter called Comparative binder resin (1).

COMPARATIVE EXAMPLE 2

Polymerization for yielding a polymer was conducted using only the following monomers and catalyst; 390 g of polyoxyethylene(2.2)-2,2-bis(4-hydroxyphenyl)propane, 12 g of fumaric acid, 55 g of isododecenylsuccinic anhydride, 110 g of terephthalic acid and 1 g of dibutyltin oxide, which were the same as the compounds used to produce the polymer (other than the vinyl resin) of Example 2.

The change in polymerization degree was traced by softening point measurement in accordance with ASTM E28-67. At the time when the softening point of the polymer reached 110° C., the reaction was terminated.

The glass transition temperature of the thus-obtained resin was determined by DSC and was found to be 65° C.

In the same 2-l four-necked glass flask as that used in Comparative Example 1 were placed 390 g of the above-obtained resin and then 550 g of xylene. After the resin was dissolved in the xylene, replacement with nitrogen was conducted and the solution was then heated to 135° C.

In the dropping funnel attached to the above four-necked flask were then introduced 820 g of styrene and 180 g of 2-ethylhexyl acrylate as monomers for a vinyl resin and 40 g of azobisisobutyronitrile as a polymerization initiator, which were the same as the compounds used to produce the vinyl resin of Example 2. This mixture in the dropping funnel was dropwise added to the xylene solution at 135° C. in the flask over a period of 4 hours, and the resulting reaction mixture was aged for 5 hours at the same temperature of 135° C. The reaction mixture was then heated to 200° C. and the xylene was removed by evaporation under reduced pressure. The residue was taken out of the flask and placed in a vat, where it was cooled and then pulverized.

The change in polymerization degree was traced in the same manner as earlier described, and at the time when the softening point of the resin reached 120° C., the reaction was terminated.

The glass transition temperature of the thus-obtained resin was determined by DSC and, as a result, the chart had two peaks at 61° C. and 65° C.

The above-obtained resin is hereinafter called Comparative binder resin (2).

COMPARATIVE EXAMPLE 3

Polymerization of 400 g of styrene and 77 g of 2-ethylhexyl acrylate, which were the same monomers as those used to produce the vinyl resin in Example 3, was conducted in 280 g of xylene in the same manner as was used in Comparative Example 1 for yielding the resin having a glass transition temperature of 66° C.

The softening point of the thus-obtained resin was measured in accordance with ASTM E28-67 and was found to be 150° C. The glass transition temperature of the resin was 65° C. This resin is hereinafter called Resin (a).

Subsequently, polymerization for yielding a polymer was conducted using only the following monomers and catalyst; 720 g of polyoxyethylene(2.2)-2,2-bis(4-hydroxyphenyl) propane, 22 g of fumaric acid, 102 g of isododecenylsuccinic anhydride, 203 g of terephthalic acid and 2 g of dibutyltin oxide, which were the same as the compounds used to produce the polymer (other than the vinyl resin) of Example 3.

The change in polymerization degree was traced by measuring the softening point of the polymer being produced, and, at the time when the softening point reached 108° C., the reaction was terminated. The glass transition temperature of the thus-obtained resin was determined by DSC and was found to be 61° C. This resin is hereafter called Resin (b).

To 1,000 parts of xylene were added 500 parts of Resin (a) and 1,000 parts of Resin (b). The resulting mixture was stirred to dissolve the resins. The xylene was then removed by evaporation under reduced pressure and the residual resin was pulverized.

The thus-obtained resin had a softening point of 120° C. The glass transition temperature of the resin was determined by DSC and, as a result, the chart had two peaks at 61° C. and 65° C.

The above-obtained resin is hereinafter called Comparative binder resin (3).

EXAMPLES 4 TO 7 AND COMPARATIVE EXAMPLES 4 TO 6

The ingredients for each of the formulations given below were pre-mixed with a Henschel mixer and then melt-kneaded with a twin-screw extruder. After cooling, each resulting composition was pulverized and classified by conventional techniques, thereby preparing a toner having an average particle diameter of 11 μm.

| Toner Formulation | Amount |
|---|---|
| Example 4 | |
| Binder resin (1) | 90 parts |
| Carbon black "#44" (manufactured by Mitsubishi Chemical Industries Ltd., Japan) | 7 parts |
| Charge control agent of the negatively charged type "Aizen Spilon Black TVH" (manufactured by Hodogaya Chemical Co., Ltd.) | 2 parts |
| Example 5 | |
| Binder resin (2) | 90 parts |
| Carbon black "#44" | 7 parts |
| Charge control agent of the negatively charged type "Bontron S-34" (manufactured by Orient Chemical Industries Ltd.) | 2 parts |
| Example 6 | |
| Binder resin (3) | 98 parts |
| Copper phthalocyanine | 2 parts |
| Example 7 | |
| Binder resin (1) | 90 parts |
| Carbon black "#44" | 7 parts |
| Charge control agent of the positively charged type "Bontron N-01" (manufactured by Orient Chemical Industries Ltd.) | 2 parts |
| Comparative Example 4 | |
| Comparative binder resin (1) | 90 parts |
| Carbon black "#44" | 7 parts |
| Charge control agent of the negatively charged type "Aizen Spilon Black TVH" | 2 parts |
| Comparative Example 5 | |
| Comparative binder resin (2) | 90 parts |
| Carbon black "#44" | 7 parts |
| Charge control agent of the negatively charged type "Aizen Spilon Black TVH" | 2 parts |
| Comparative Example 6 | |
| Comparative binder resin (3) | 90 parts |

| Toner Formulation | Amount |
|---|---|
| Carbon black "#44" | 7 parts |
| Charge control agent of the negatively charged type "Aizen Spilon Black TVH" | 2 parts |

0.1 Part of hydrophobic silica "H-2000" (trade name of a product manufactured by Wacker Chemicals Co.) was mixed by means of a Henschel mixer with 100 parts of each of the toners obtained in the above Examples 4 to 7 to thereby allow the silica particles to adhere to the toner particles, thus obtaining Toners 1 to 4. In a similar manner, the same silica was allowed to adhere to each of the toners obtained in the above Comparative Examples 4 to 6, thereby obtaining Comparative Toners 1 to 3, respectively.

Each of the above-obtained toners was mixed, in an amount of 39 parts, with 1,261 parts of a ferrite powder (average particle diameter: 100 μm) in which the ferrite particles had been coated with a styrene-methyl methacrylate resin, whereby, developer compositions were prepared. The thus-obtained developer compositions were used in copying with commercially available electrophotographic duplicator (in which the photosensitive material was amorphous selenium for Toners 1 to 3 and Comparative Toners 1 to 3 and an organic photoconductor for Toner 4, where the rotational speed of the fixing roller was 255 mm/sec, the temperature of the heated roller in the fixing apparatus was variable, and the fuser oil-supplying device had been detached).

Through the above copying test, the toners were evaluated for image-fixing properties and offset properties, with the fixing temperature being controlled in the range of from 120° C. to 220° C. The results obtained are shown in Table 1.

The lowest fixing temperature for a toner is the fixing roller temperature at which the fixing rate of the toner exceeds 70%. This fixing rate of the toner is determined by placing a load of 500 g on a sand-containing rubber eraser having a bottom area of 15 mm×7.5 mm which contacts the fixed toner image, placing the loaded eraser on an fixed toner image obtained in the fixing apparatus, moving the loaded eraser on the image backward and forward five times, measuring the optical reflective density of the eraser-treated image with a reflective densitometer manufactured by Macbeth Co., and then calculating the fixing rate from this density value and a density value before the eraser treatment using the following equation.

$$\text{Fixing rate} = \frac{\text{Image density after eraser treatment}}{\text{Image density before eraser treatment}}$$

The pulverizability of a resin was evaluated by the following simplified pulverization test.

Simplified Pulverization Test

The resin which has undergone a conventional pulverization step is subjected to classification using sieves to thereby obtain a resin powder which passes through a 16-mesh sieve but which does not pass through a 20-mesh sieve. Then, 30.00 g of the resin powder obtained by the above classification is pulverized for 15 seconds with a coffee mill (Type HR-2170, manufactured by PHILLIPS Co.), and then classified with a 32-mesh sieve. The amount (A(g)) of the resin which does not pass through the sieve is weighed, and the percentage of this residue of resin is determined using the following equation.

$$\text{Residue percentage (\%)} = \frac{A\ (g)}{\text{Resin weight (30.00 g) before coffee mill pulverization}} \times 100$$

The above procedure is conducted three times, and resins of from 0 to 15.0% in average residue percentage are shown by [A], those of from 15.1 to 30.0% by [B], those of from 30.1 to 45.0% by [C], and those of from 45.1 to 100% by [D].

TABLE 1

| | Image Density | Lowest fixing temperature (°C.) | Cold offset disappearing temperature (°C.) | Hot offset disappearing temperature (°C.) | Pulverizability of resin |
|---|---|---|---|---|---|
| Toner 1 | 1.40 | 130 | 125 | 220< | A |
| Toner 2 | 1.39 | 131 | 125 | 220< | A |
| Toner 3 | 1.37 | 129 | 125 | 220< | A |
| Toner 4 | 1.39 | 130 | 125 | 220< | A |
| Comparative Toner 1 | 1.35 | 140 | 135 | 220< | A |
| Comparative Toner 2 | 1.36 | 150 | 135 | 220< | D |
| Comparative Toner 3 | 1.36 | 140 | 135 | 220< | A |

The charge amount was measured by means of a blow off type charge-measuring device, i.e., a specific charge-measuring device equipped with a Faraday cage, a capacitor, and a voltmeter. The measurement was conducted by the following method. First, W g (0.15–0.20 g) of a developer prepared as above is placed in a measuring cell made of brass and equipped with a 500 mesh stainless steel sieve (the mesh size being changeable to a size which does not allow the carrier particles to pass therethrough as required). Suction is then applied through a suction opening for 5 seconds, followed by blowing air for 5 seconds at an air pressure of 0.6 kg/m² controlled by an air pressure regulator, to thereby remove only the toner from the measuring cell. Upon blowing the air, the voltage (V (volt)) at two seconds after the initiation of the blowing is measured using the voltmeter. Then, the specific charge (Q/m) of the toner can be obtained using the following equation:

$$Q/m\ (\mu c/g) = \frac{C \times V}{m}$$

where C ($\mu$F) is the electrical capacity of the capacitor and m is the amount (weight) of the toner contained in W g of the developer composition. Since toner content in a sample is expressed by T/D×100 (%), where D (g) is the amount of the developer and T (g) is the amount of the toner contained in the developer composition, the above toner amount m (g) can be obtained using the following equation:

$$m\ (g) = W \times \frac{T}{D}$$

Using each of the developer compositions obtained as above described, 50,000 sheets of copies were continuously produced with the earlier described electrophotographic duplicator in a normal environment (23° C., 50% RH) and in a high temperature and high humidity environment (35° C., 85% RH). Through this copying test, the toners were comparatively evaluated for changes in charge amount and occurrence of ground sheet fouling in the test. The results obtained are shown in Table 2.

TABLE 2

| | Charge amount of toner ($\mu$c/g) | Change in charge amount*1) ($\mu$c/g) | Change in charge amount*2) ($\mu$c/g) | Image quality NN | Image quality HH |
|---|---|---|---|---|---|
| Toner 1 | −18.5 | −1 | −3 | good | good |
| Toner 2 | −19.1 | −1 | −2 | good | good |
| Toner 3 | −20.0 | −1 | +1 | good | good |
| Toner 4 | +19.5 | +1 | −1 | good | good |
| Comparative Toner 1 | −19.5 | +3 | +8 | *3) | *4) |
| Comparative Toner 2 | −18.5 | +5 | +9 | *5) | *6) |
| Comparative Toner 3 | −20.0 | +4 | +6 | *3) | *7) |

Notes;
*1):Change in charge amount after production of 50,000 sheets of copies in the normal condition
*2)Change is charge amount after production of 50,000 sheets of copies in high temperature and high humidity condition
*3)Remarkable ground sheet fouling from the 5,000th sheet of copy
*4)Remarkable ground sheet fouling from the 2,000th sheet of copy
*5)Remarkable ground sheet fouling from the 4,000th sheet of copy
*6)Remarkable ground sheet fouling from the 1,000th sheet of copy
*7)Remarkable ground sheet fouling from the 3,000th sheet of copy From the results summarized in Table 1, it can be seen that as compared to Comparative Toners 1 to 3 (Comparative Examples 4 to 6), Toners 1 to 4 (Examples 4 to 7) are low with respect to lowest fixing temperature and have a cold offset-disappearing temperature and have good image-fixing properties, offset properties, and thermal efficiency.

Further, the results summarized in Table 2 show that as compared to Comparative Toners 1 to 3 (Comparative Examples 4 to 6), Toners 1 to 4 (Examples 4 to 7) undergo only slight changes in charge amount and give high quality images either in a normal environment (23° C., 50% RH (NN)) or in a high temperature and high humidity environment (35° C., 85% RH (HH)). Therefore, the developer composition according to the present invention can be used even under severe environmental conditions.

While the invention has been described in detail and with reference to specific embodiments thereof, it will be apparent to one skilled in the art that various changes and modifications can be made therein without departing from the spirit and scope thereof.

What is claimed is:

1. A process for producing a binder resin which comprises:
   blending in a reactor a raw monomer for a first polymerization system and a raw monomer for a second polymerization system which undergoes polymerization through a reaction path different from a reaction path of the first polymerization system, wherein the raw monomer for the first polymerization system yields a vinyl resin by radical polymerization and the raw monomer for the second polymerization system yields a polyester, a polyester-polyamide or a polyamide;
   then conducting the polymerization of the first and second polymerization systems in the same reactor after the addition of from 0.1 to 20 parts by weight per 100 parts by weight of the raw monomer for the first polymerization of a polymerization initiator, wherein said polymerization is conducted at a temperature of from room temperature to 250° C. and the raw monomer for the first polymerization and the raw monomer for the second polymerization are used in amounts to give a ratio of the vinyl resin to the polyester, polyester-polyamide or polyamide resin in the binder resin of 10:90 to 90:10 parts by weight; and recovering the binder resin.

2. The process of claim 1, wherein said first monomer is a compound selected from the group consisting of ethylenically unsaturated aromatic compounds and ethylenically unsaturated monocarboxylic acids and esters thereof, and said second monomer is a monomer for yielding a polyester.

3. The process of claim 1, wherein said first monomer is one or a combination of any two of styrene, (meth)acrylic acid and a (meth)acrylate, and said second monomer is a monomer for yielding a polyester.

* * * * *